US011057288B2

(12) United States Patent
Ubillus et al.

(10) Patent No.: US 11,057,288 B2
(45) Date of Patent: Jul. 6, 2021

(54) TRACKING OF DOCUMENT STATUS THROUGH MULTIPLE COMPUTER NETWORKS

(71) Applicant: SAP SE, Walldorf (DE)

(72) Inventors: Alexander Ubillus, Palo Alto, CA (US); Kam Yue, Palo Alto, CA (US); Arun Thiyagarajan, Cupertino, CA (US); Veronica Vijil, Palo Alto, CA (US); Huihang Liang, Palo Alto, CA (US); Orville Pinto, Palo Alto, CA (US); Jiawei Sun, Palo Alto, CA (US); Giso Schroeder, Palo Alto, CA (US)

(73) Assignee: SAP SE, Walldorf (DE)

( * ) Notice: Subject to any disclaimer, the term of this patent is extended or adjusted under 35 U.S.C. 154(b) by 583 days.

(21) Appl. No.: 15/373,993

(22) Filed: Dec. 9, 2016

(65) Prior Publication Data

US 2018/0075004 A1 Mar. 15, 2018

Related U.S. Application Data

(60) Provisional application No. 62/395,250, filed on Sep. 15, 2016.

(51) Int. Cl.
*H04L 12/26* (2006.01)
*H04L 29/08* (2006.01)
*G06Q 30/06* (2012.01)
(Continued)

(52) U.S. Cl.
CPC .......... *H04L 43/0894* (2013.01); *G06F 16/11* (2019.01); *G06Q 10/10* (2013.01);
(Continued)

(58) Field of Classification Search
CPC .............. G06F 17/2264; G06F 17/211; G06F 17/2205; G06F 16/11; H04L 43/0894;
(Continued)

(56) References Cited

U.S. PATENT DOCUMENTS 6,199,068 B1 * 3/2001 Carpenter .............. G01D 4/004
8,402,061 B1 * 3/2013 Briggs .............. G06F 17/30557
707/706

(Continued)

*Primary Examiner* — Cesar B Paula
*Assistant Examiner* — David Faber
(74) *Attorney, Agent, or Firm* — Schwegman Lundberg & Woessner, P.A.

(57) ABSTRACT

In an example embodiment, a first function is performed on the first document received at first middleware management architecture, causing a change in the status of the first document. The change is logged in a record corresponding to the first document in a memory. Then the first document is sent to a second network via a transmission protocol layer. A notification of a change in the status of the first document within the second layer is received in a layer other than the transmission protocol layer, from the second network. The change in the second network is logged in the record corresponding to the first document in the memory. Information corresponding to the change in the status of the first document at the middleware management architecture and the change in the status of the first document in the second network is reported to the first network.

20 Claims, 14 Drawing Sheets

(51) Int. Cl.
*G06F 16/11* (2019.01)
*G06Q 10/10* (2012.01)

(52) U.S. Cl.
CPC ......... *G06Q 30/0633* (2013.01); *H04L 67/06* (2013.01); *H04L 67/22* (2013.01)

(58) Field of Classification Search
CPC ......... H04L 67/22; H04L 67/06; G06Q 10/10; G06Q 30/0633
USPC ....................................................... 715/249
See application file for complete search history.

(56) References Cited

U.S. PATENT DOCUMENTS

| | | | | |
|---|---|---|---|---|
| 8,572,157 | B2* | 10/2013 | Bouw | G06F 17/30569 707/741 |
| 2002/0023122 | A1* | 2/2002 | Polizzi | G06F 17/30873 709/202 |
| 2002/0091533 | A1* | 7/2002 | Ims | G06Q 30/06 709/230 |
| 2004/0111464 | A1* | 6/2004 | Ho | H04L 29/06 709/203 |
| 2004/0117802 | A1* | 6/2004 | Green | G06F 11/3006 719/318 |
| 2005/0262130 | A1* | 11/2005 | Mohan | G06F 17/2725 |
| 2006/0036941 | A1* | 2/2006 | Neil | G06F 9/451 715/234 |
| 2006/0059253 | A1* | 3/2006 | Goodman | G06Q 10/06 709/223 |
| 2006/0184675 | A1* | 8/2006 | Salmre | H04L 63/10 709/227 |
| 2007/0136592 | A1* | 6/2007 | Smith | H04L 63/105 713/171 |
| 2008/0082575 | A1* | 4/2008 | Peter | G06Q 10/10 |
| 2008/0215354 | A1* | 9/2008 | Halverson | G06Q 30/06 705/1.1 |
| 2013/0061129 | A1* | 3/2013 | Liu | H04L 67/22 715/234 |
| 2014/0149592 | A1* | 5/2014 | Krishna | G06F 1/329 709/226 |
| 2014/0153387 | A1* | 6/2014 | Wu | H04L 47/36 370/230 |
| 2016/0043868 | A1* | 2/2016 | Hoffmann | H04L 9/3247 713/176 |
| 2016/0364277 | A1* | 12/2016 | Anderson | G06F 9/541 |

\* cited by examiner

FIG. 5

| Network | Discovery | Exchange | AW Options... | Page |

NETWORK                                                                                                      Switch
                                                                                                             jU-9bX Home Inbox Outbox Catalogs Supplier Enablement Administration Reports Orders and Releases Time & Expense Sheets Discount Opportunities Scheduled Payments Remittances Receipts More...

Orders and Releases

▶ Search Filters

Orders and Releases                                                                        View Failed Orders to Private Supplier

| Type | Order Number | Supplier | Ship To Address | Amount | Date ↓ | Routing Status | Amount Invoiced | Revision | Actions |
|------|--------------|----------|-----------------|--------|--------|----------------|-----------------|----------|---------|
| ▼ Order Status: Changed (1) | | | | | | | | | 502 |
| Order | PO-AQUIV... | suppl... | Acme, Sunnyv... | $1,240.00 USD | 21 Jan 2016 | Sent | $0.00 USD | Changed | Actions — Print Details — View Transaction Status |
| ▼ Order Status: Obsoleted (3) | | | | | | | | | |
| Order | PO-AQUIV... | suppl... | Acme, Sunnyv... | $1,240.00 USD | 18 Mar 2016 | Acknowledged | $0.00 USD | Original | |
| Order | PO-AQUIV... | suppl... | Acme Sunnyvale, CA United States | $1,240.00 USD | 21 Jan 2016 | Acknowledged | $0.00 USD | Changed | |
| Order | PO-AQUIV... | suppl... | Acme Sunnyvale, CA | $1,240.00 USD | 21 Jan 2016 | Acknowledged | $0.00 USD | Original | Actions |

500

```
<?xml version="1.0" encoding="UTF-8"?>
<!DOCTYPE cXML SYSTEM "http://svcdev7.ariba.com/schemas/cXML/1.2.028/InvoiceDetail.dtd">
<cXML payloadID="1442827955901-3661241616279667999@10.163.1.224"
    timestamp="2015-09-21T02:32:39-07:00"><Response><Status
    <Response><Status code="400" text="Bad Request">
Supplier organization not yet configured to receive OrderResuest details.
Please contact support with error code: ANERR-300000000000000000286761
</Status></Response></cXML>
```

TRACKING OF DOCUMENT STATUS THROUGH MULTIPLE COMPUTER NETWORKS

CROSS-REFERENCE TO RELATED APPLICATIONS

This application claims the benefit of U.S. Provisional Application No. 62/395,250, filed Sep. 15, 2016, which is incorporated herein by reference in its entirety.

TECHNICAL FIELD

This document generally relates to systems and methods for computer software. More specifically, this document relates to tracking of documents through multiple computer networks.

BACKGROUND

Many business-to-business (B-to-B) transactions, such as a company purchasing goods from a supplier, are handled via interactions between computer programs. Sometimes there may be a variety of different computer systems involved in a single transaction. One piece of software running on a supplier system may handle requests for proposals from companies and send terms for a transaction. Another piece of software running on a company system may receive the proposal and send a purchase order. Other pieces of software running on the supplier system and company system may handle invoicing and remittance of payments, respectively, and so on. Of course, the purchaser may have their own purchaser system that generates requests for proposals, terms, purchase orders, and the like. Additionally, a single document may wind up passing through multiple different supplier systems before being complete.

Middleware management software may lie in the middle of the various purchaser and supplier systems and aid in management of the documents and their related workflows. Due to the large number of transactions that pass through such a middleware management architecture, and the increasing number of rules applied throughout the process (such as workflows performed on each document), sometimes documents can experience delays or even failures. For example, a workflow for responding to a purchase order may include operations such as acceptance (performed by one person or entity), retrieving the items from inventory (performed by a different person or entity), and shipping (performed by yet another different person or entity), and the like. From the purchaser perspective, it is important to be able to understand where a delay occurred and why, or even if an error occurred that prevents the order from being completed. Customers need to be informed so that they can react promptly and prevent losses due to documents not reaching the destination without any awareness.

Unfortunately, due to the presence of multiple different systems and networks involved in the document handling process and potentially part of the workflow, there is no technical way to accomplish this level of insight efficiently. This is even more important when a middleware layer is in the cloud and none of the parties has technical access to the middleware infrastructure except a data integration.

BRIEF DESCRIPTION OF DRAWINGS

The present disclosure is illustrated by way of example and not limitation in the figures of the accompanying drawings, in which like references indicate similar elements and in which:

FIG. 1 is a system, in accordance with an example embodiment, for managing lifecycle of a document in multiple networks.

FIG. 5 is a screen capture illustrating an outbox user interface in accordance with an example embodiment.

FIG. 7 is a diagram illustrating a message depicting a status, in accordance with an example embodiment.

FIG. 8 is a screen capture illustrating a dashboard with a classic view, in accordance with an example embodiment.

DETAILED DESCRIPTION

Figure 1:
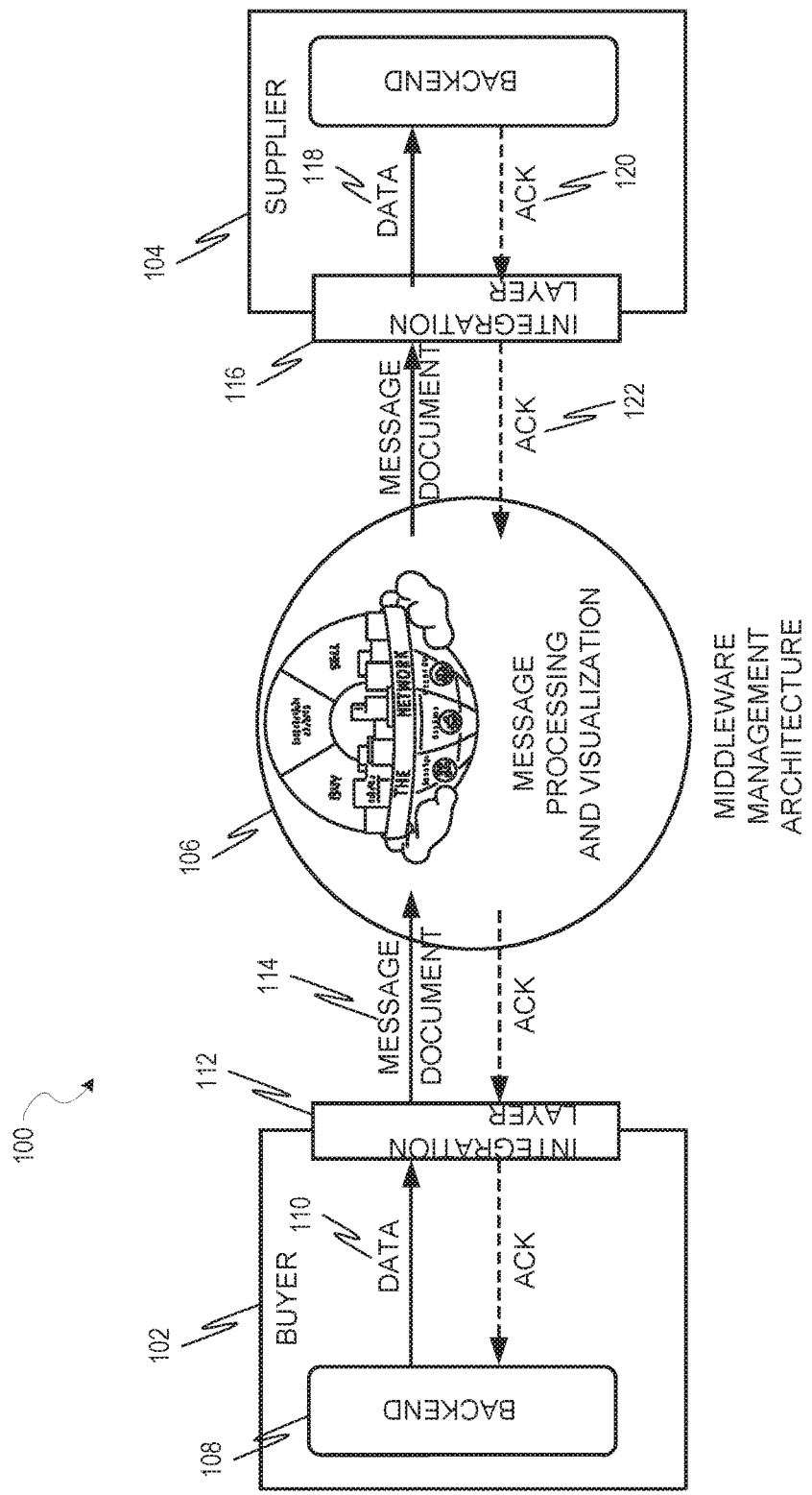
FIG. 1 is a block diagram illustrating a system, in accordance with an example

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, steps undertaken as part of a workflow on a document are recorded in order to provide a comprehensive view of the status of each document. This is reflected mainly in two ways: changes in status maybe reported to the customer, and an extended history of the document may be provided to inform the customer about additional information about the status.

In order to overcome the technical challenges involved in providing such a comprehensive view of document status when that status may be affected or controlled by multiple disparate computer systems, a standardized list of statuses, also herein known as checkpoints, can be introduced for all document types. These checkpoints may be implemented throughout the document flow. The checkpoints may be saved in a specialized schema, known as a Community schema, since logging these checkpoints may present a problem with rapidly growing data. The checkpoint data can be summarized and used later to display the current status of the documents to the customer in order to increase visibility.

Table 1 below is an example of a list of statuses in accordance with an example embodiment.

TABLE 1

| Status Checkpoint name | Description |
| --- | --- |
| DocumentReceivedFailed | The document was received but had invalid credentials or some other error and was rejected. |
| DocumentReceived | The document was received in AN (through CXMLDispatcher) and stored in the propagation queue. |
| DocumentInPropagation | The document has been enqueued for propagation to the corresponding community. |
| DocumentPropagationDelayed | The document has failed on its first attempt to be sent to the corresponding community. Followed by 1210. |
| DocumentPropagationFailed | The document failed during propagation. To be immediately followed by status 1240. |
| DocumentPropagationSuccessful | The document was successful when propagating and returned success to the requesting community |
| DocumentInPropProc | The document has been successfully sent to the propagation processor in the corresponding community |
| DocumentPropProcFailed | The document was sent to the corresponding community but it failed before completing. To be followed by 1240. |
| DocumentPropProcSuccessful | The propagation processor has been successful |
| ProcessingSuccessful | The document was successfully processed in AN |
| ProcessingDelayed | The document couldn't be sent on the first attempt at any checkpoint during AN routing. |
| ProcessingFailed | The document failed to be processed after all retry attempts were exhausted. |
| DocumentInOutDisp | The document has been enqueued for dispatch to the corresponding gateway |
| DocumentInPoDispatcher | Just before the PO dispatcher sends the document |
| GatewayDeliveryConfirmed | The document was successfully sent to the outbound gateway for processing. |
| GatewayDeliveryDelayed | The document couldn't be sent on the first attempt to the gateway. Retries will follow. |
| GatewayDeliveryFailed | The document failed to be sent to the gateway after all retry attempts. |
| DeliverySuccesful | The document was successfully delivered to the customer (but no processing confirmation has been issued yet) |
| DeliveryDelayed | The document is experiencing delays while trying to reach the customer |
| DeliveryFailed | The document couldn't be sent to the customer due to a failure between the gateway and the customer |
| DeliveryReady | When sending to the buyer, the document has been enqueued and is ready for pick-up. |
| CustomerConfirmed | The customer has confirmed that the document has been processed successfully |

TABLE 1-continued

| Status Checkpoint name | Description |
| --- | --- |
| CustomerReceived | The customer has confirmed that the document has been received successfully |
| CustomerFailed | The customer has received the document and is reporting a failure in the content |

In North America, data exchange is closely linked to terms like "functional acknowledgement," "technical acknowledgement", or "status tracking". In Europe and in the Asia/Pacific region the "delivery notification" or similar technical response approaches are de facto standard.

Therefore, in an example embodiment, the platform provides the capability to report document status changes in a manner that conveys more than would ordinarily be conveyed in just the existing HTTP response.

In an example embodiment, technical acknowledgements are required on certain levels for each outbound document back to the originator, so the sending party has visibility of each status change (or of exceptions so the sender can re-act accordingly). Of course, this would cover error statuses but also could conceivably provide end-to-end visibility.

FIG. 1 is a system 100, in accordance with an example embodiment, for managing lifecycle of a document in multiple networks. The system 100 includes a buyer network 102, a supplier network 104, and a middleware management architecture 106. It should be noted that while the buyer network 102 is labeled as "buyer" and the supplier network 104 is labeled as "supplier", the same concepts as described herein could be applied to any two distinct networks, regardless of their status on one side or the other of a transaction.

Buyer network 102 contains a backend 108, which acts to perform various functions within the buyer network 102, such as document generation and management, and user interface interactions. Regardless of how these functions are performed, and at some point data 110 is transmitted by the backend 108. This data 110 may be, for example, a document such as a business document (e.g., purchase order). The data 110 may be sent to the middleware management architecture 106 via an integration layer 112. The integration layer 112 acts to translate documents and messages between formats compatible with the buyer network 102 and formats compatible with the middleware management architecture 106. This may involve, for example, translating data 110 into message document 114. It should be noted that there are various ways to implement the integration layer 112, including, for example, an application program interface offered by the middleware management architecture 106. Various functionalities of the integration layer 112 may be performed at the buyer network 102, at the middleware management architecture 106, or a combination of both, as well as in a separate device, such as an integration gateway.

The middleware management architecture 106 may, in some example embodiments, be located in a cloud environment, where various functions and databases of the middleware management architecture 106 are distributed across many devices, and possibly in many different geographic areas.

The middleware management architecture 106 may perform various functions on the message document 114 while the message document 114 is in the domain of the middleware management architecture 106. While many of these functions are outside the scope of this disclosure, the functions may, in an example embodiment, including tracking and recording status while the message document 114 is within the domain of the middleware management architecture 106.

At some point, the middleware management architecture 106 may send the message document 114 to the supplier network 104. This may be performed via an integration layer 116. The integration layer 116 acts to translate documents and messages between formats compatible with the middleware management architecture 106 and formats compatible with the supplier network 104. This may involve, for example, translating message document 114 into data 118. It should be noted that there are various ways to implement the integration layer 116, including, for example, an application program interface offered by the middleware management architecture 106. Various functionalities of the integration layer 116 may be performed at the supplier network 104, at the middleware management architecture 106, or a combination of both, as well as in a separate device, such as an integration gateway.

A backend 120 in the supplier network 104 then acts to acknowledge receipt of the data 118. In some example embodiments, this acknowledgement 122 may be perform after some level of validation of the data 118 is performed. For example, the backend 120 may be not just acknowledging that the packets that contain the data 118 have all been received, but that the data 118 itself contains values that are valid (e.g., as compared against preset ranges) and include all necessary information. For example, in the case of a purchase order, the backend 120 may validate that quantities for each component ordered in the purchase order have been provided, that valid identifications of the components ordered have been provided, and that a price specified meets certain criteria (not the least of which, for example, may be that the price is specified in positive numbers).

The acknowledgement 122 may be sent to the middleware management architecture 106 via integration layer 116. The middleware management architecture may log the acknowledgement 122 and then send it to the backend 108 in the buyer network 102 via the integration layer 112.

In an example embodiment, the backend 120 in the supplier network 104 also performs additional supplier-specific functions on the data 118. This may include, for example, processing the data 118 according to one or more business processes. For example, in the case of a purchase order, the supplier network 104 may have several predefined steps for handling purchase order, including, for example, order validation, inventory checks, approval, fulfillment, and shipping. Each of these steps, when performed, may alter the status of the data 118. Ordinarily such status changes may result in supplier-specific status updates to be generated between components in the supplier network 104. While this allows the supplier network 104 to track the status of the document, it does not allow the middleware management architecture 106, or by extension the buyer network 102, to track the status. Since various problems or errors could occur within the supplier network 106 that could delay or otherwise impact the buyer network 102, it would be desirable for the buyer network 102 to be made aware of the status.

As such, in an example embodiment, in lieu of or in conjunction with the generation of supplier-specific status updates, the backend 120 in the supplier network 104 generates status updates in a standardized format and communicates these standardized status updates to the middleware management architecture 106.

In an example embodiment, a business rule for the buyer organization is defined that allows the switching on and off of integrated documents in an existing format, such as commerce extensible markup language (cXML). cXML is a protocol for communication of business documents between procurement applications, e-commerce hubs, and suppliers. cXML provides XML schemas for business transactions. This rule may also allow the configuration of granularity/coverage of the acknowledgements.

The delivery of the status updates may be performed either on a push or a pull basis. In an example embodiment, handshaking between the middleware management architecture 106 and external networks, such as a buyer network 102, may be implemented as technical acknowledgements for integrated outbound messages.

Figure 2:
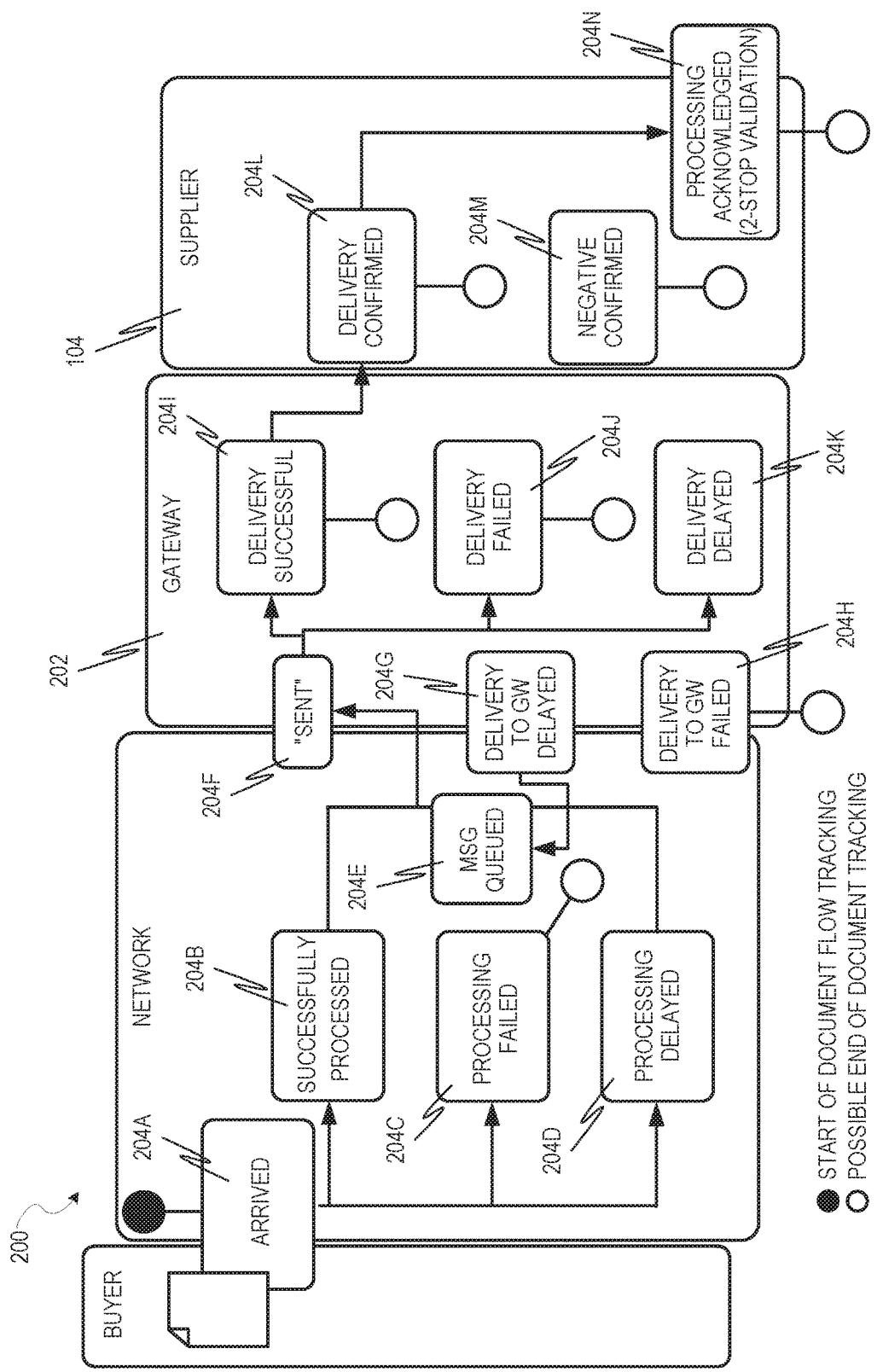
FIG. 2 is a system, in accordance with an example embodiment, for communicating between a middleware management architecture and a supplier network.

FIG. 2 is a system 200, in accordance with an example embodiment, for communicating between a middleware management architecture 106 and a supplier network 104. The system 200 is represented in form of a status transmission graph. Here, the integration layer 116 has been implemented as an integration gateway 202. This is merely one example of an integration layer 116, however, as integrated documents may occur via, for example, an enterprise resource planning (ERP) Add-On, Process Integration (PI) adapter, or Integration Gateway. This helps to ensure that the middleware management architecture always 106 receives valid cXML data.

Notably, the integration gateway 202 may generate status updates as well as the supplier network 104.

An acknowledgement message is a signal sent by the receiver that reports the status of a received document back to the originator. The amount of status information depends on the sending/receiving approach utilized and on the capabilities of the generating system.

The technical acknowledgement may be focused on the document flow (e.g., on top of the transmission protocol level, such as HTTP response or AS2 MDN). Each business document may be considered to be a business object that has a certain unique and well-defined status at any time. Status changes may be reported in a signal message called "technical acknowledgement."

In order to implement the technical acknowledgement for document tracking, in an example embodiment document status values are introduced based on a transactional document life cycle over the full end-to-end view between buyer and supplier. To track a document over the full flow, the role of the document creator is irrelevant, as either the buyer or supplier may originate a document and transfer the data via the middleware management architecture to the recipient.

Referring to FIG. 2, the middleware management architecture 106 receives data, and thus can generate an "arrived" status 204A. Processing of the data on the middleware management architecture 106 may result in statuses of "successfully processed" 204B, "processing failed" 204C, or "processing delayed" 204D. In the case of successfully processed 204B or "processing delayed" 204D, when the data is queued to be sent to the integration gateway 202 a status of "message queued" 204E may result. Then various status messages about the sending of the data to the integration gateway 202 may be reported, such as "sent" 204F, "delivery to gateway delayed" 204G, or "delivery to gateway failed" 204H. The integration gateway 204 may generates its own statuses, such as "delivery successful" 204I, "delivery failed" 204J, or "delivery delayed" 204K. The supplier network may then generate statuses such as "delivery confirmed" 204L (indicating that the data has been received and is valid), or "negative confirmed" 204M (indicting that the data has been received but is not valid). In the case of "delivery confirmed" 204L, an additional status of "processing acknowledge" 204N may be generated when one or more steps in a business process have been performed on the data.

From the network perspective, the outbound and inbound direction work similarly. However, the processing (and therefore the monitoring) starts on the "receiving end", which is the middleware management architecture. The process of receiving includes not only the technical transmission protocol but also, in some example embodiments, an optional mapping from the supplier's data format into a format understood by the middleware management architecture, such as cXML. This mapping may be created and maintained in a number of ways, such as via an API, as is discussed elsewhere in this disclosure.

Figure 3:
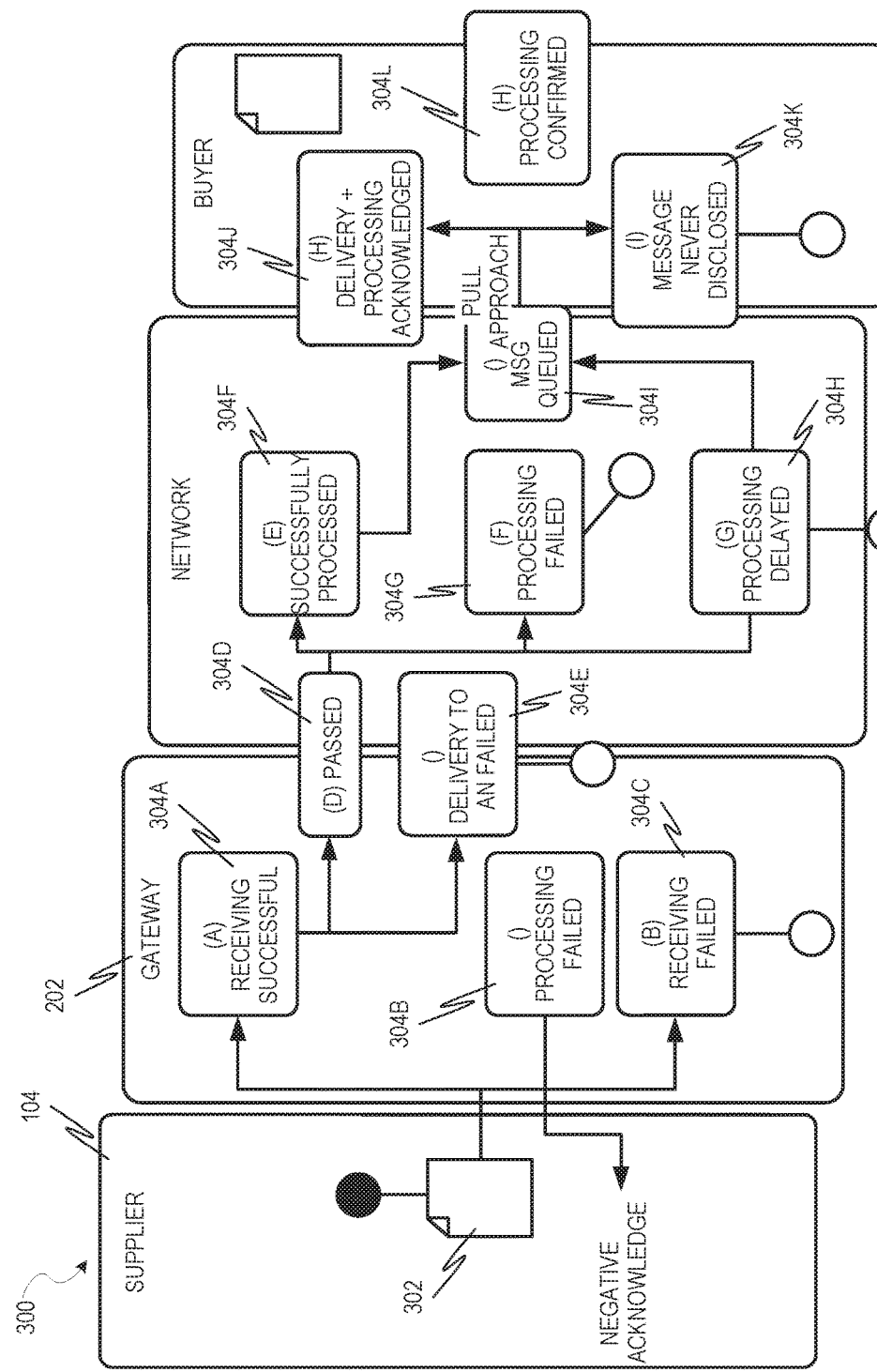
FIG. 3 is a system, in accordance with an example embodiment, for communicating between a middleware management architecture 106 and a buyer network.

FIG. 3 is a system 300, in accordance with an example embodiment, for communicating between a middleware management architecture 106 and a buyer network 102. The system 300 is represented in form of a status transmission graph.

The supplier network 104 may send data 302 to the buyer network 102 via the integration gateway 202 and the middleware management architecture 106. For example, the supplier network 102 may send an invoice to the buyer network 102. The integration gateway 202 may generate a status of "receiving successful" 304A when it receives the data and it is valid, or a status update of "receiving failed" 304B if it is not valid. If processing is performed on the integration gateway 202, then it may additionally generate a status of "processing failed" 304C. The integration gateway 202 then attempts to send the data to the middleware management infrastructure 106, resulting in a "passed" 304D status if it is passed successfully and a "delivery unsuccessful" 304E status if it is not.

On the middleware management infrastructure 106, processing of the data may result in a "successfully processed" 304F, "processing failed," 304G or "processing delayed" 304H status. In the case of "successfully processed" 304F, a message may be placed into a queue and a "message queued" 304I status generated. Using a pull approach, the buyer network 102 can acknowledge processing and delivery (or failure thereof) using a "delivery and processing acknowledged" 304J status, or "message never disclosed" 304K. Once processing is complete on the buyer network 102, a processing confirmed 304L status can be generated.

The following are various use cases for some of the predefined message statuses:

Outbound Statuses

Message "Arrived" at Middleware Management Architecture

This is the entry point at the middleware management architecture 106. While the middleware management architecture 106 may handle message receiving within the Hypertext Transfer Protocol (HTTP) to confirm with synchronous HTTP response code 200, telling that the message was physically received, additionally, within this HTTP response certain failure codes depending on cXML or AN ID validation may be generated. In case the validation was successful, the message document can be imported and queued for inbound processing. From the originator's perspective the status is now "successfully arrived".

Message Successfully Processed at Middleware Management Architecture

After the message was queued, the middleware management architecture 106 may process the message according to the existing processing logic and configured business rules.

If all processing could be performed, the consolidated data is written to DB. The document was successfully persisted and validated in both Buyer and Supplier communities.

As soon as this step is performed, the status will be "successfully processed". The status "successfully processed" is important for the buyer in order to finalize the outbound process. Now that the buyer knows the message was processed in the middleware management architecture 106 it is no longer the buyer's responsibility to impel the message processing. Therefore this status can be populated on the Buyer dashboard.

Message Processing Failed at Middleware Management Architecture

This status may cover any permanent error situation in the middleware management architecture that needs further investigation and blocks the successful processing of the data.

Message Processing Delayed at Middleware Management Architecture

Even if the application logic does not raise an exception or there are no system exceptions causing an error, there might be events that delay the finalization of processing, for instance:

Network congestions because of scalability issues

Heavy load based on batch processing of a high number of messages

Exceptional long database response times

Dead lock situations that can be resolved with manual network admin interaction only File system input/output (I/O) issues This status may update as to any of these occurrences.

Message Successfully Queued at Middleware Management Architecture

This is a status describing that the message was put in an internal queue to be picked up for delivery to the final destination.

Message Sent at Middleware Management Architecture

The status describes the business message was passed to the communication gateway. Reaching this status also means the work for the sender network is done and the communication to the recipient starts.

Message Delivery Successful

Depending on the transmission protocol used this response (HTTP response code, AS2 MDN) from the supplier's side indicates that the physical movement of the data to the end point was successful.

Message Delivery Failed

World-wide Internet-based inter-company data exchange has its challenges. Not all data transmissions work smooth at all times. Therefore, the delivery of the business document to the supplier can fail. The protocol response provides additional details about the cause of failure; it may or may not make sense to try multiple times to deliver the message again.

Displaying this permanent error on the dashboard allows the buyer to evaluate alternative options if the business case requires action before the problem was fixed.

Message Delivery Delayed

Several technical, organizational or operational reasons may cause the gateway to queue/store the document temporarily before the data can be delivered. This results in a delay situation.

Message Delivery Confirmed

Again, this status enhances visibility. Not only the transmission layer confirmed delivery from the middleware management architecture to the receiving party, but now an "active" confirmation of the consuming party has been received. Even if this confirmation highly depends on the technical infrastructure of the supplier it is worth to catch the status because the buyer now is safe: the data are not only on the remote system, but the supplier is aware and can process the data. We assume to get this confirmation only if the supplier is able to read and process the data (they are validated to be syntactically correct and complete, do not violate any rules on the supplier side a.s.o.).

Usually, the receiving party uses a functional acknowledgement (FA 997 in ANSI ASC X12, CONTROL in EDIFACT) to confirm the message receiving.

This message status basically tells the buyer "the data are here and valid—I am able to process". From now on, the business message no longer can be disputed by any party and it is the supplier's responsibility To process the data To act according to the business case in the data To fulfill the supplier's obligations Or at least, to inform the buyer about any issues if those come up For the middleware management architecture 106 this status also finalizes the responsibility of the network—the end-to-end monitoring could mark the network exit point as "green".

Message Processing Acknowledged

Finally, in case the supplier confirmed the processing of the message (for instance using the StatusUpdateRequest) this means for the buyer the message went into "production" status at the supplier.

This status implies that the data were not only valid but could also be processed. The data match the supplier's business capabilities, the processing entity (human being or ERP application) has full understanding of the data details and can act accordingly.

Usually, a message recipient acknowledges the processing by sending an extra message back to the originator (Transaction 824 in ANSI ASC X12, APERAK in EDIFACT).

Inbound Statuses

Message "Successfully Processed" at Middleware Management Architecture

After the message was queued, the middleware management architecture 106 is going to process the message according to the existing processing logic and configured business rules. If all processing could be performed, the consolidated data is expected to be written to a database. The document was successfully persisted and validated in both Buyer and Supplier communities.

As soon as this step is performed, the status is "successfully processed". The status "successfully processed" is important for the buyer in order to finalize the outbound process. Now that the buyer knows the message was processed in the middleware management architecture; it is no longer the buyer's responsibility to impel the message processing.

Message "Processing Failed" at Middleware Management Architecture

This status may cover any permanent error situation in the middleware management architecture that need further investigation and blocks the successful processing of the data.

Message "Processing Delayed" at Middleware Management Architecture

Even if the application logic does not raise an exception or there are no system exceptions causing an error there might be events that delay the finalization of processing, for instance:

Network congestions because of scalability issues

Heavy load based on batch processing of a high number of messages

Exceptional long database response times

Dead lock situations that can be resolved with manual network admin interaction only File system I/O issues "Message Never Disclosed"

A particular message (or a bunch of messages in this state) are in the respective queue in order get pulled from the buyer's integration layer solution. However, it hasn't been fetched for a certain period of time. So, the message is stuck—even if no error occurred.

In an example embodiment, the technical acknowledgement includes business data from the original business document (e.g., PO number, invoice number, date of transmission), internal status information (e.g., where in the message currently in the middleware management architecture and what is its processing status), and, if appropriate, external status information received using one of the above-identified status update types. In some cases, the acknowledgement "value" even might be forwarded to the originator of a business document. The functional acknowledgement in many scenarios is either a code (numeric or alphanumeric values) or a string (formatted or free text), or a combination of both. To make it even more complex, this value differs depending on the protocol and data format that is used.

The code itself is known to the mapping engines and can be "translated" in other codes for the receiving system. However, in some cases, the sending party expects to get back the original code from the receiving party in order to know what happened. Thus, in an example embodiment, the middleware management component is able to receive this information, process it, and even transfer it back to the originator of the message.

Figure 4:
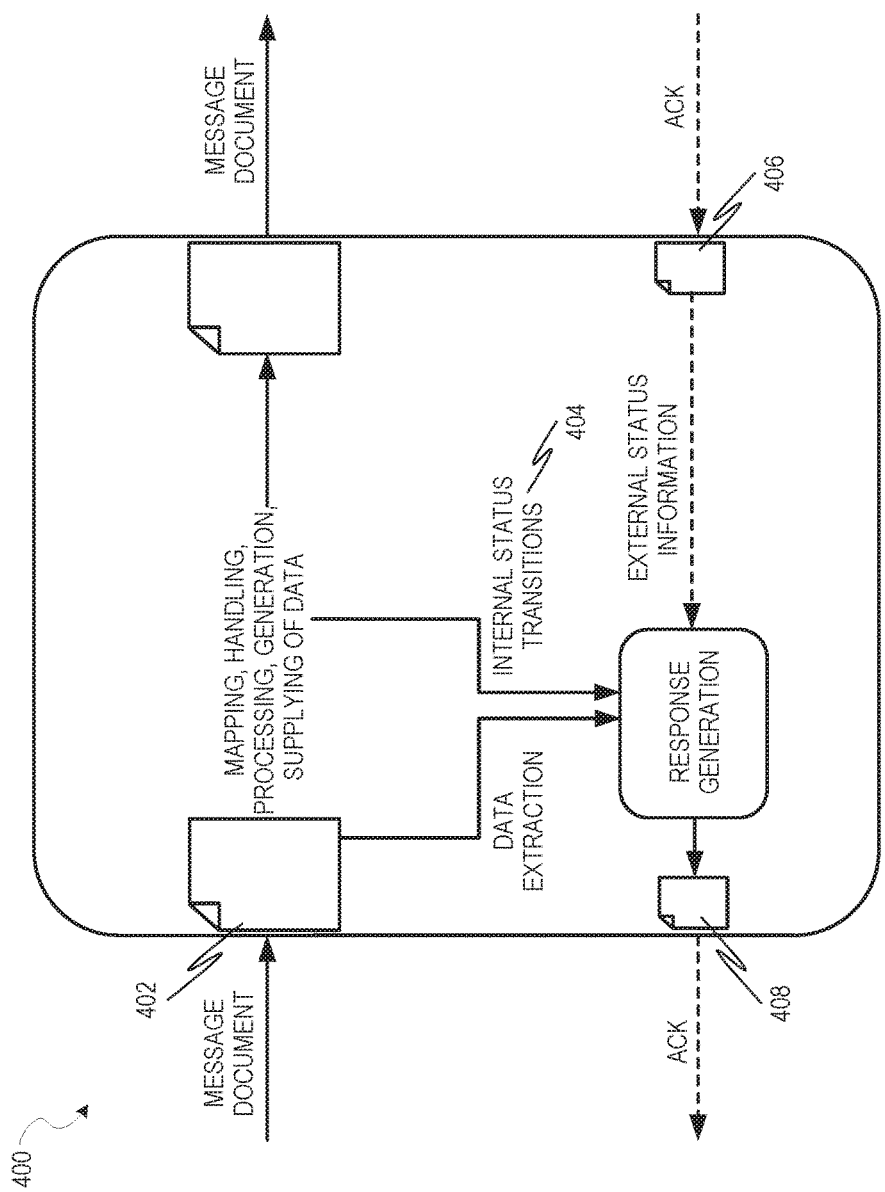
FIG. 4 is a system, in accordance with another example embodiment, for managing lifecycle of a document by processing and generating technical acknowledgements in a network.

FIG. 4 is a system 400, in accordance with another example embodiment, for managing lifecycle of a document by processing and generating technical acknowledgements in a computer network.

Here, middleware management architecture 106 receives message document 402 from a first network. It then maps, handles, and processes the data, generating one or more internal status transitions 404. The message document 402 is then passed to a second network. One or more acknowledgements 406 are received from the second network. The one or more acknowledgements include external status information. The internal status transitions 404 and the external status information 406 is used to generate a response acknowledgement 408 to the first network.

In an example embodiment, since the document ID may not be unique across the middleware management architecture, the status update request (SUR) carries the payload ID of the business document.

In an example embodiment, reconciliation of a technical acknowledgement with the original business document is implemented for synchronous and asynchronous acknowledgements.

In an example embodiment, a technical acknowledgement may be considered any message with content that describes positive or negative confirmation for a referred business document above transmission protocol level. These messages can have different representations depending of the data format used and business relationship, such as Functional Acknowledgement 997 (ANSI ASC X12), CONTRL (EDIFACT), Transaction Set 824, or APERAK (EDIFACT)

In an example embodiment, the middleware management architecture 106 generates and processes/reconciles a cXML technical acknowledgement message that contains at least the following information/data:

Technical transmission envelope (sending/receiving entity, date, time, type of cXML message [ACK, SUR]).

Referred business document header information (document number PO number, Invoice number, sending/receiving business party identifier, date/time of the original business document)

Payload ID

Acknowledgement status

Additional status information

Recommended action (from the creator or the ACK) to resolve an exception

Status of the document from the standpoint of the original creator of the acknowledgement message (if a supplier provides acknowledgement details, the supplier is the creator, AN just passed through the status information—maybe a repacking required . . . ) The status may be one of the following values (maybe supported by an numerical equivalent) PLUS a verbal hint, such as a specified code known to both sides of the transmission, that allows additional text information for better understanding on the recipient's side:

Received in AN (includes it is syntactically correct)

Successfully processed in AN (could be booked internally in AN)

Processing failed in AN (something went wrong in AN)

Processing delayed in AN (some congestion in AN that will be handled from the network side)

Target document generated in AN

Message delivered successfully (to the supplier)

Message delivery failed

Message delivery confirmed (supplier confirmed the receiving of the document)

Message processing acknowledged (supplier acknowledges the document processing)

Furthermore, one or more user interface (UI) pages may be altered to indicate to a user that status information for a document may be available. A dashboard view may provide a condensed view of all status messages in the last X days and the number of messages currently in their respective status. Furthermore, an "outbox" may be updated with outbound messages so as to provide a convenient way for the document originator to see documents and their respective statuses.

FIG. 5 is a screen capture illustrating an outbox user interface 500 in accordance with an example embodiment. As can be seen, a "view transaction status" action 502 is available in the outbox user interface 500. This view transaction status action 502, when selected, displays a transaction status derived from one or more status updates provided by the procedures outlined above. Performing the "View Transaction Status" action 502 collects all details in the background and opens a new window (or pop-up) for the user.

Figure 6:
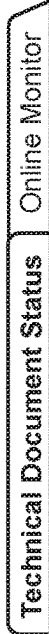
FIG. 6 is a screen capture illustrating a new window or popup resulting from performing a "view transaction status" action in accordance with an example embodiment.

FIG. 6 is a screen capture illustrating a new window or popup 600 resulting from performing a "view transaction status" action in accordance with an example embodiment. This view helps the user to understand what the current status of a particular document is. The view can provide some basic information like: the document ID, the current date/time, the statuses that where passed successfully (with a checkmark), the exceptions (with an exclamation mark), and the date/time when a particular status was reached and logged.

If the user clicks on the marks (in column "Type"), additional relevant information for a given status will be shown so the user gets even more details for this status (for instance the HTTP response after confirmation or the internal event number that caused the delay). FIG. 7 is a diagram illustrating a message depicting this status, in accordance with an example embodiment.

In another example embodiment, a dedicated dashboard may be provided.

Figure 8:
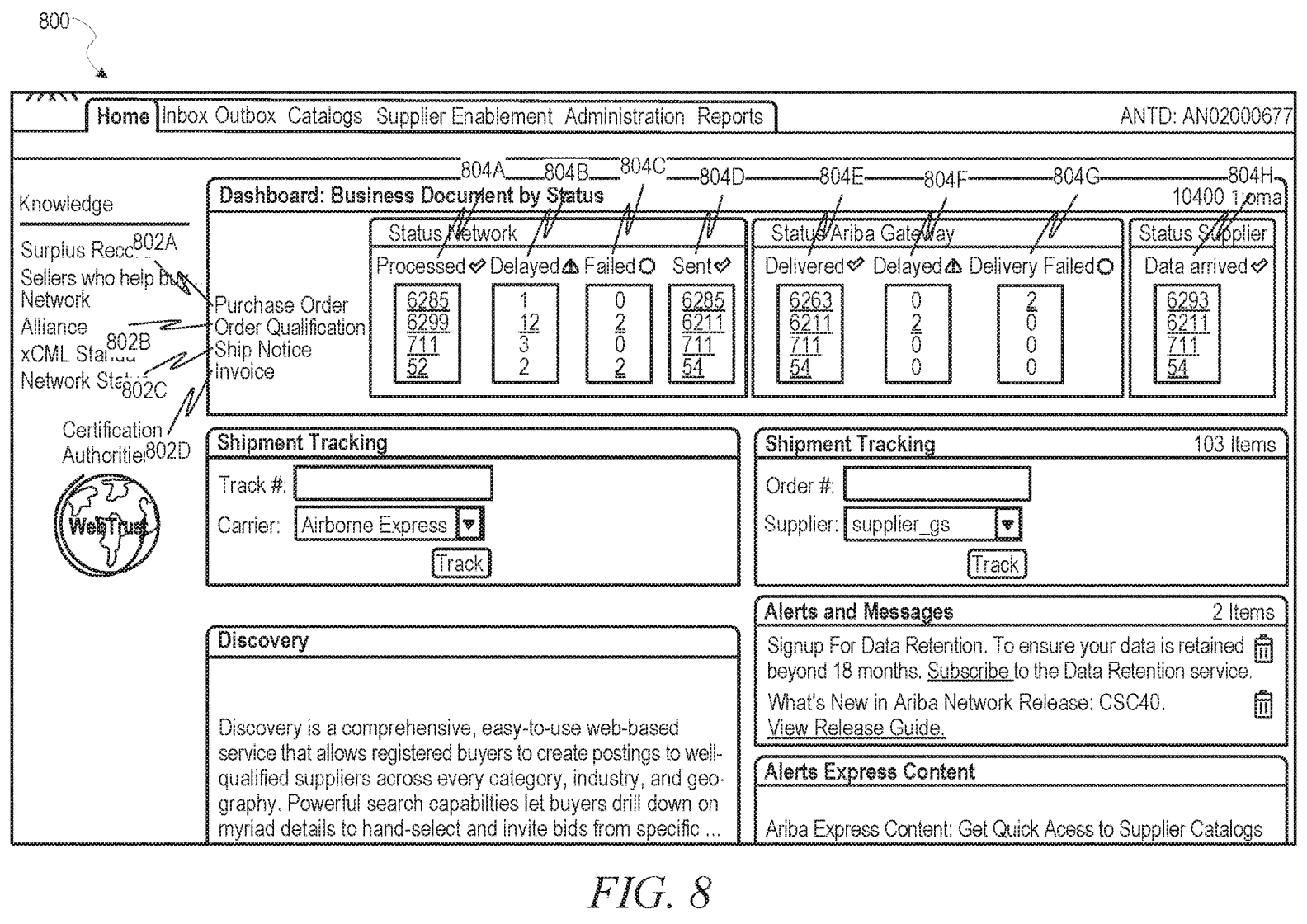

FIG. 8 is a screen capture illustrating a dashboard 800 with a classic view, in accordance with an example embodiment. The dashboard 800 provides a plurality of hyperlinks 802A-802D to various documents, along with various status information 804A-804H for each document. Specifically, status information 804A-804D are middleware management architecture statuses, status information 804E-804G are integration gateway statuses, and status information 804H are supplier statuses.

The advantage of the classic view is that by following the hyperlinks the user can jump right into the respective applications and modules to investigate the lists of affected messages, including the business content. Alternatively, for a mobile user, an alternative dashboard may be provided. Performing the "View Transaction Status" may collect all details in the background and open a new window (or pop-up).

Figure 9:
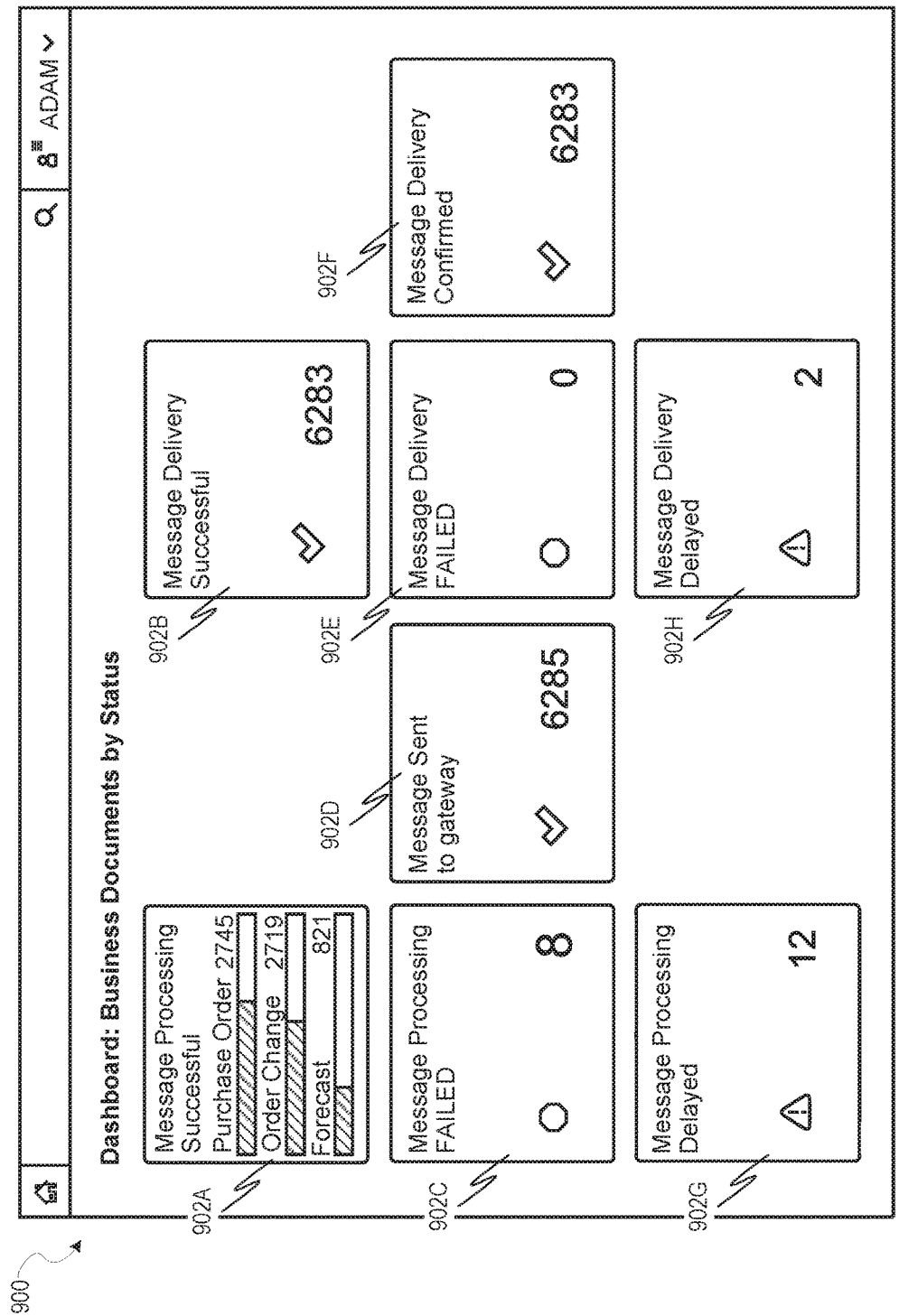
FIG. 9 is a screen capture illustrating a dashboard with a mobile device view in accordance with an example embodiment.

FIG. 9 is a screen capture illustrating a dashboard 900 with a mobile device view in accordance with an example embodiment. Here, each status is represented by a living tile 902A-902H that presents condensed numbers or even quickchart information.

Figure 10:
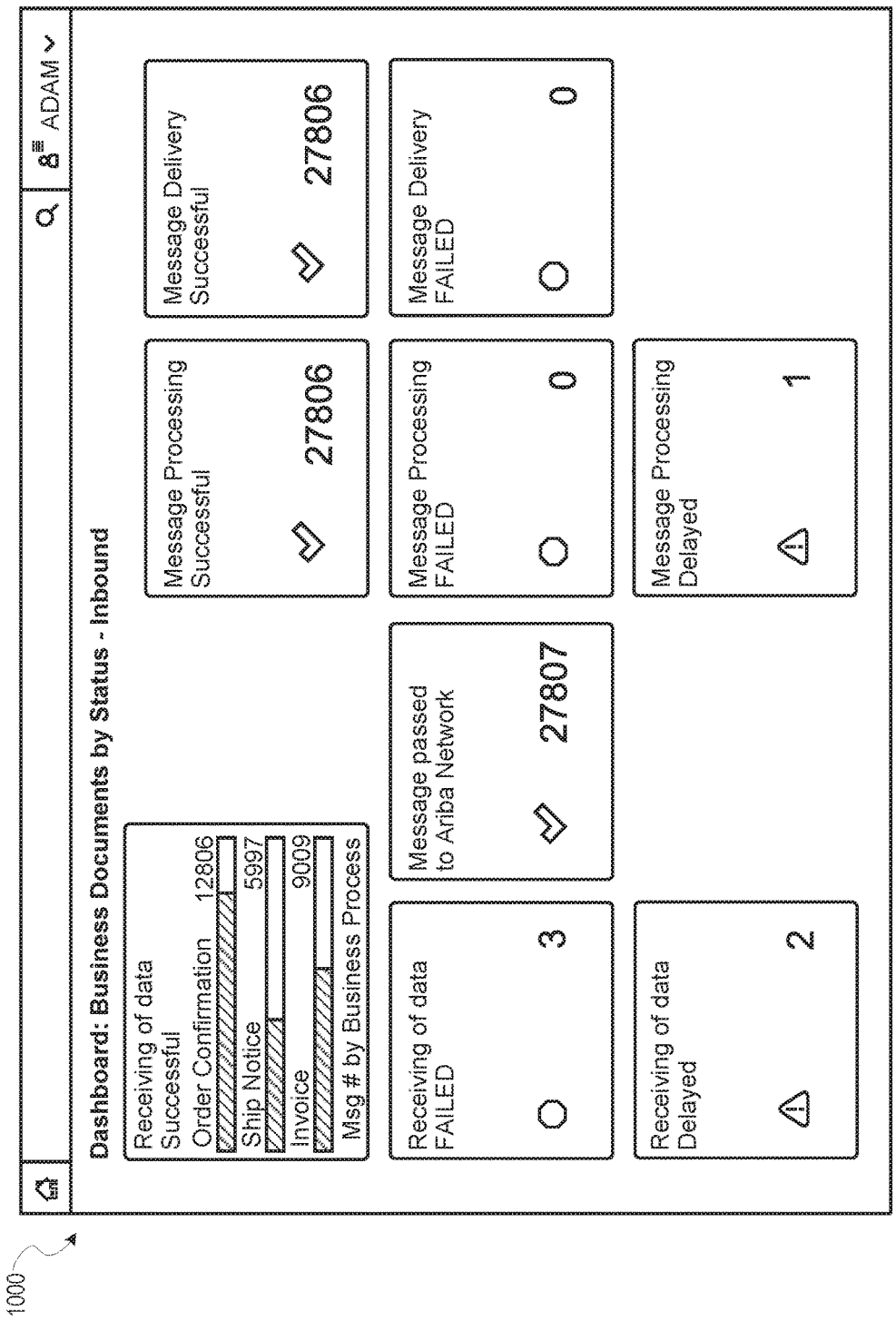
FIG. 10 is a screen capture illustrating a dashboard with a mobile device view in accordance with another example embodiment.

FIG. 10 is a screen capture illustrating a dashboard 1000 with a mobile device view in accordance with another example embodiment. This view is similar to that as presented in FIG. 9, except from the perspective of inbound statuses.

Furthermore, in an example embodiment, a new UI page is provided with several filters/selectors (For example, to select the message type and a timeframe for messages). This UI page may collect the current status or even full status history for all messages instantly.

In an example embodiment, incoming technical acknowledgement messages are handled as follows. Information is retrieved from the technical acknowledgement message, the information is used to locate the corresponding business document, the status of the document is validated according to the current network status, the technical acknowledgement is repacked (if necessary) for transmission to the document originator, and the repacked technical acknowledgment is sent to the document originator. If there is a conflict between the supplier's acknowledgement information and the network status, or if the corresponding business document cannot be located, the middleware management architecture can reject the technical acknowledgement with a negative status response in cXML format.

In some example embodiments, the above functions may be implemented as an Application Program Interface (API).

In an example embodiment, in order to improve processing efficiency and network bandwidth, documents are grouped together in batches when sent. A batching algorithm is provided such that when batches of records are sent, status updates received via the above-described mechanisms are examined to determine if any of the documents had a failure of some sort. For documents with a failure, they are placed back into a batching buffer and sent along with the next batch of documents. In order to handle such a batching algorithm, the size of the buffer may be set larger than the batch size (which itself is configurable). As such, adjusting the batch size may result in an increase in the buffer size to compensate. Additionally, after a document has spent more than a preset amount of time in the buffer, it may be purged, on the assumption that the document will not ever be processed without a failure, in order to ensure there is enough room in the buffer for subsequent documents.

In an example embodiment, the batch size may be set based on process. In another example embodiment, the batch size may be dynamically adjusted based on various metrics, some of which may be runtime metrics. Such metrics may include mode of the central processing unit (CPU), system load, network bandwidth, scheduling factors, etc.

In an example embodiment, the middleware management architecture 106 performs statistical calculation regarding to the CPU and memory usage. The thread will collect CPU data points periodically, and take an average of the CPU and Memory data points periodically. If both CPU and Memory usage are below preset thresholds respectively, and there are many queue items waiting on the queue for processing, it will add additional worker threads to process the queue items.

Figure 11:
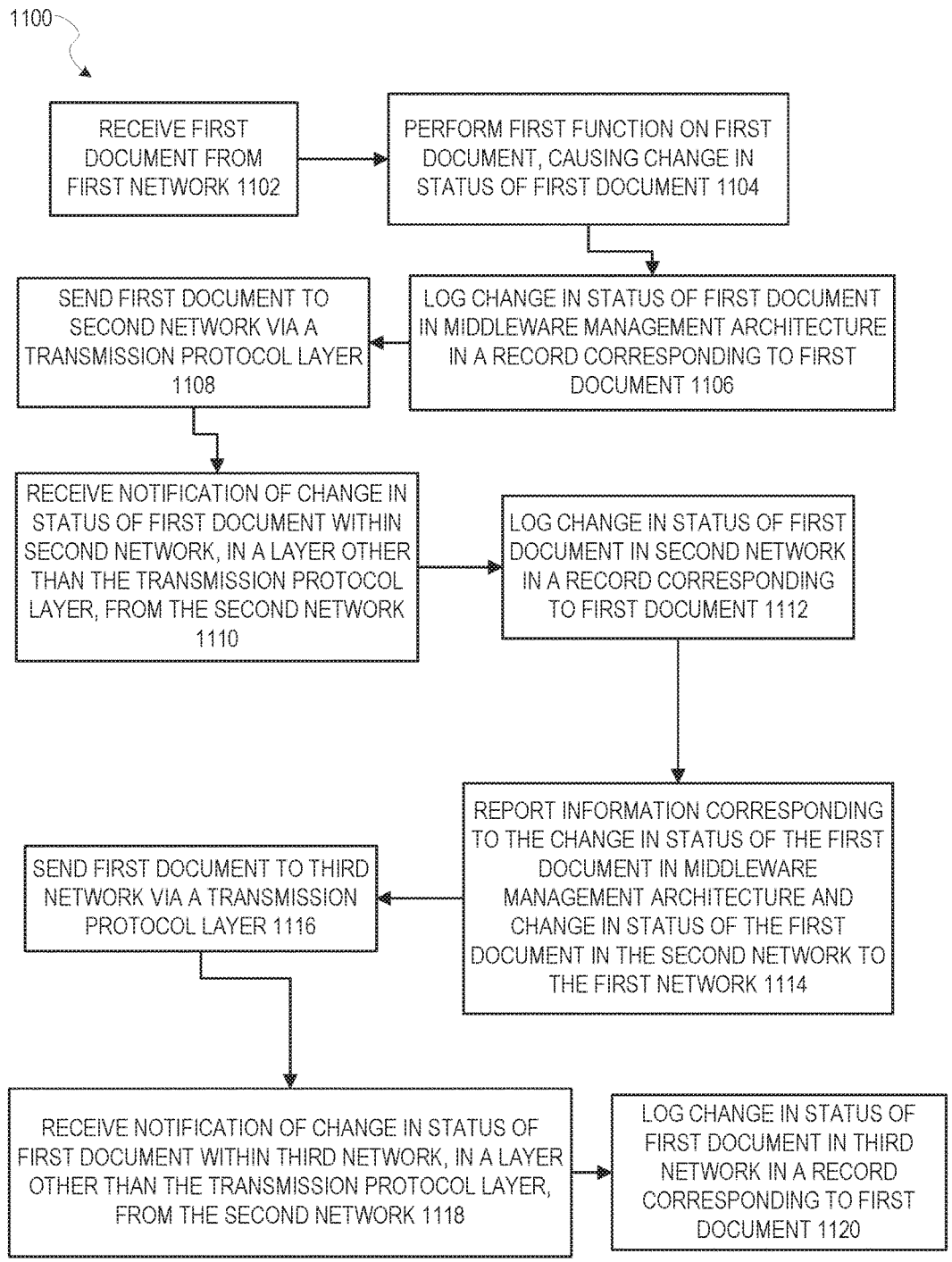
FIG. 11 is a flow diagram illustrating a method of tracking status of a computerized document through multiple computer networks.

FIG. 11 is a flow diagram illustrating a method 1100 of tracking status of a computerized document through multiple computer networks. In an example embodiment the method 1100 is performed in a middleware management architecture. At operation 1102, a first document is received from a first network. At operation 1104, a first function is performed on the first document, causing a change in the status of the first document. At operation 1106, the change in the status of the first document is logged in a record corresponding to the first document in a memory.

At operation 1108, the first document is sent to a second network via a transmission protocol layer. At operation 1110, a notification of a change in status of the first document within the second network is received in a layer other than the transmission protocol layer, from the second network. At operation 1112, the change to the status of the first document in the second network is logged in the record corresponding to the first document in the memory. At operation 1114, information corresponding to the change in the status of the first document in the middleware management architecture and the change in the status of the first document in the second network is reported to the first network.

At operation 1116, the first document is sent to a third network via a transmission protocol layer. This may or may not be the same transmission protocol layer as in operation 1110. At operation 1118, a notification of a change in status of the first document within the third network is received in a layer other than the transmission protocol layer (of either operation 1116 or operation 1108), from the second network. At operation 1120, the change to the status of the first document in the third network is logged in the record corresponding to the first document in the memory.

In some example embodiments, operations 1102, 1108, 1110, 1116 and 1118 are performed either by integration layers within the middleware management architecture or separate integration servers.

Figure 12:
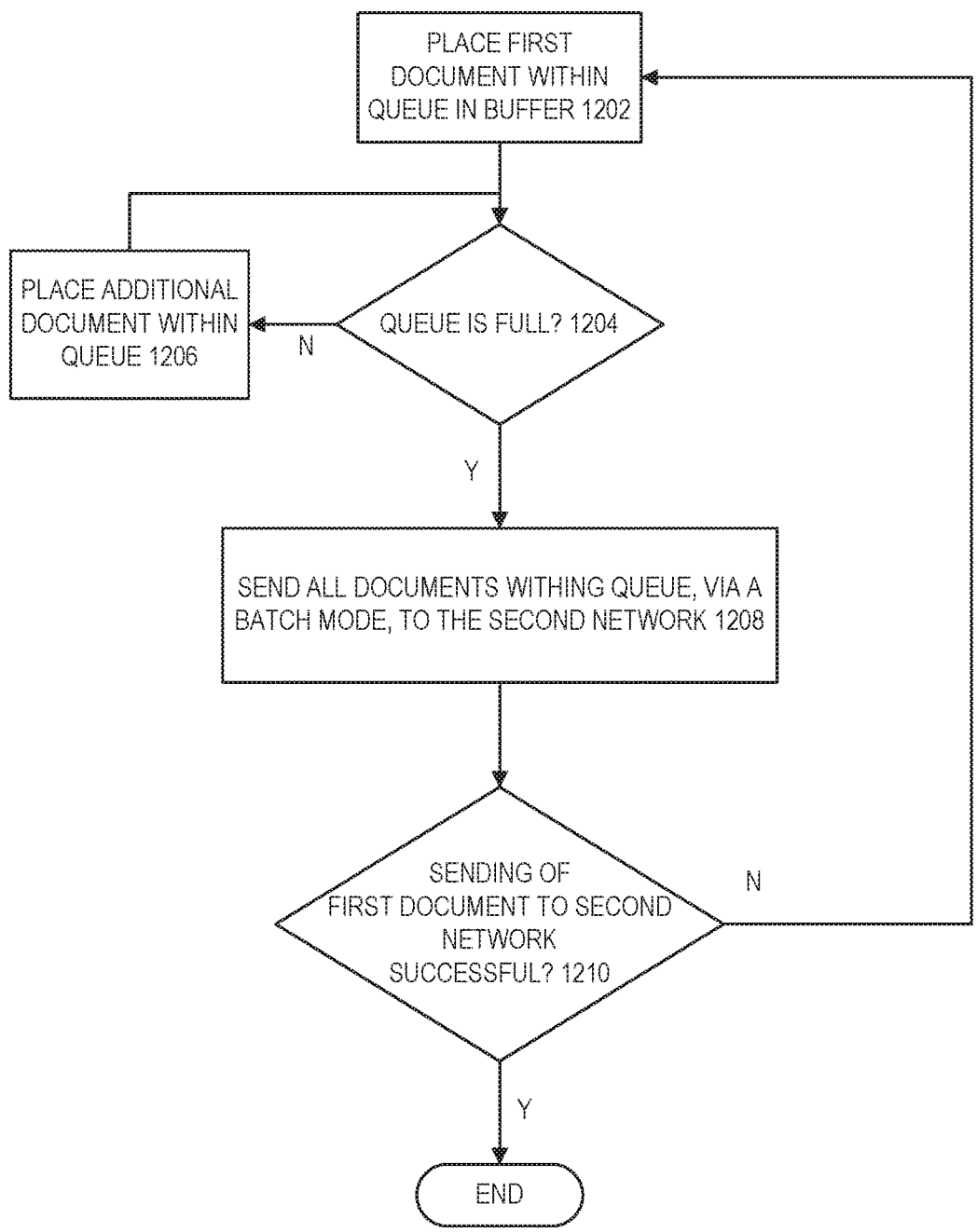
FIG. 12 is a flow diagram illustrating a method of sending of the first document to a second network in more detail in accordance with an example embodiment.

FIG. 12 is a flow diagram illustrating a method 1108 of sending of the first document to a second network in more detail in accordance with an example embodiment. At operation 1202, the first document is placed in a queue within a buffer. At operation 1204, it is determined if the queue is full. If not, then at operation 1206 an additional document is placed in the queue. If so, then at operation 1208 all documents within the queue are sent via a batch mode to the second network. At operation 1210, it is determined whether the sending of the first document to the second network was successful. If so, then the method 1108 ends. If not, then the first document is placed back into the queue at operation 1220 and the method 1108 loops back to operation 1204.

In another example embodiment, an API is provided that exposes the error information built into the technical acknowledgement. By virtue of this API, customers are provided with a self-service ability to check where each of their transactions are in the approval process.

EXAMPLES

Example 1

A system comprising:

at least one processor;

a memory; and a middleware management architecture engine executable by the at least one processor and configured to:

perform a first function on a first document received from a first network, causing a change in the status of the first document;

log the change in the status of the first document in a record corresponding to the first document in the memory;

cause the first document to be sent to a second network via a transmission protocol layer;

receive a notification of a change in status of the first document within the second network;

log the change to the status of the first document in the second network in the record corresponding to the first document in the memory; and cause the reporting information corresponding to the change in the status of the first document in the middleware management architecture and the change in the status of the first document in the second network to the first network.

Example 2

The system of Example 1, further comprising:

an integration layer configured to:

receive a first communication comprising the first document from the first network;

transform the first communication into a format compatible with the engine;

send the first communication to the middleware management architecture engine;

transform a second communication comprising the first document into a format compatible with the second network;

send the second communication to the second network via a transmission protocol layer;

receive, in a layer other than the transmission protocol layer, from the second network, in a third communication, a notification of a change in status of the first document within the second network;

transform the third communication into a format compatible with the middleware management architecture engine; and send the third communication to the middleware management architecture engine.

Example 3

The system of Example 2, wherein the integration layer and the middleware management architecture engine are contained within a middleware management architecture.

Example 4

The system of Examples 1-3, further comprising an integration server configured to:
receive a first communication comprising the first document from the first network;
transform the first communication into a format compatible with the middleware management architecture engine;
send the first communication to the middleware management architecture engine;
transform a second communication comprising the first document into a format compatible with the second network;
send the second communication to the second network via a transmission protocol layer;
receive, in a layer other than the transmission protocol layer, from the second network, in a third communication, a notification of a change in status of the first document within the second network;
transform the third communication into a format compatible with the middleware management architecture engine; and
send the third communication to the middleware management architecture engine.

Example 5

The system of Examples 1-5, further comprising a buffer containing a queue, and the first document is sent to the first network by placing the first document in the queue and sending a plurality of document in the queue in a batch mode when the queue becomes full.

Example 6

A method of tracking status of a computerized document through multiple computer networks, the method comprising:
receiving, at a middleware management architecture, a first document from a first network;
performing, at the middleware management architecture, a first function on the first document, causing a change in the status of the first document;
logging the change in the status of the first document in a record corresponding to the first document in a memory;
sending the first document to a second network via a transmission protocol layer;
receiving, in a layer other than the transmission protocol layer, from the second network, a notification of a change in status of the first document within the second network;
logging the change to the status of the first document in the second network in the record corresponding to the first document in the memory; and
reporting information corresponding to the change in the status of the first document in the middleware management architecture and the change in the status of the first document in the second network to the first network.

Example 7

The method of Example 6, further comprising:
sending the first document to a third network via a transmission protocol layer;
receiving, in the layer other than the transmission protocol layer, from the second network, a notification of a change in status of the first document within the second network; and
logging the change to the status of the first document in the third network in the record corresponding to the first document in the memory.

Example 8

The method of Examples 6-7, wherein the sending of the first document include placing the first document in a queue within a buffer and sending a plurality of document in the queue in a batch mode when the queue becomes full.

Example 9

The method of Example 8, wherein a size of the buffer is larger than a size of the queue.

Example 10

The method of Example 9, further comprising:
examining status updates for the first document to determine whether the first document was successfully sent to the first network; and
in response to a determination that the first document was not successfully sent to the first network, placing the first document back in the queue.

Example 11

The method of Example 10, wherein both the queue and buffer sizes are dynamically determined based on network bandwidth.

Example 12

The method of Example 10, wherein both the queue and buffer sizes are dynamically determined based on processing load.

Example 13

The method of Examples 11-12, wherein both the queue and buffer sizes are also dynamically determined based on network bandwidth.

Example 14

A non-transitory machine-readable storage medium comprising instructions, which when implemented by one or more machines, cause the one or more machines to perform operations comprising:
receiving, at a middleware management architecture, a first document from a first network;

performing, at the middleware management architecture, a first function on the first document, causing a change in the status of the first document;

logging the change in the status of the first document in a record corresponding to the first document in a memory.

sending the first document to a second network via a transmission protocol layer;

receiving, in a layer other than the transmission protocol layer, from the second network, a notification of a change in status of the first document within the second network;

logging the change to the status of the first document in the second network in the record corresponding to the first document in the memory; and reporting information corresponding to the change in the status of the first document in the middleware management architecture and the change in the status of the first document in the second network to the first network.

Example 15

The non-transitory machine-readable storage medium of Example 14, further comprising:
sending the first document to a third network via a transmission protocol layer;
receiving, in the layer other than the transmission protocol layer, from the second network, a notification of a change in status of the first document within the second network; and
logging the change to the status of the first document in the third network in the record corresponding to the first document in the memory.

Example 16

The non-transitory machine-readable storage medium of Examples 14-15, wherein the sending of the first document include placing the first document in a queue within a buffer and sending a plurality of document in the queue in a batch mode when the queue becomes full.

Example 17

The non-transitory machine-readable storage medium of Example 16, wherein a size of the buffer is larger than a size of the queue.

Example 18

The non-transitory machine-readable storage medium of Example 17, further comprising:
examining status updates for the first document to determine whether the first document was successfully sent to the first network; and
in response to a determination that the first document was not successfully sent to the first network, placing the first document back in the queue.

Example 19

The non-transitory machine-readable storage medium of Example 18, wherein both the queue and buffer sizes are dynamically determined based on processing load.

Example 20

The non-transitory machine-readable storage medium of Examples 18-19, wherein both the queue and buffer sizes are also dynamically determined based on network bandwidth.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-12 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 13:
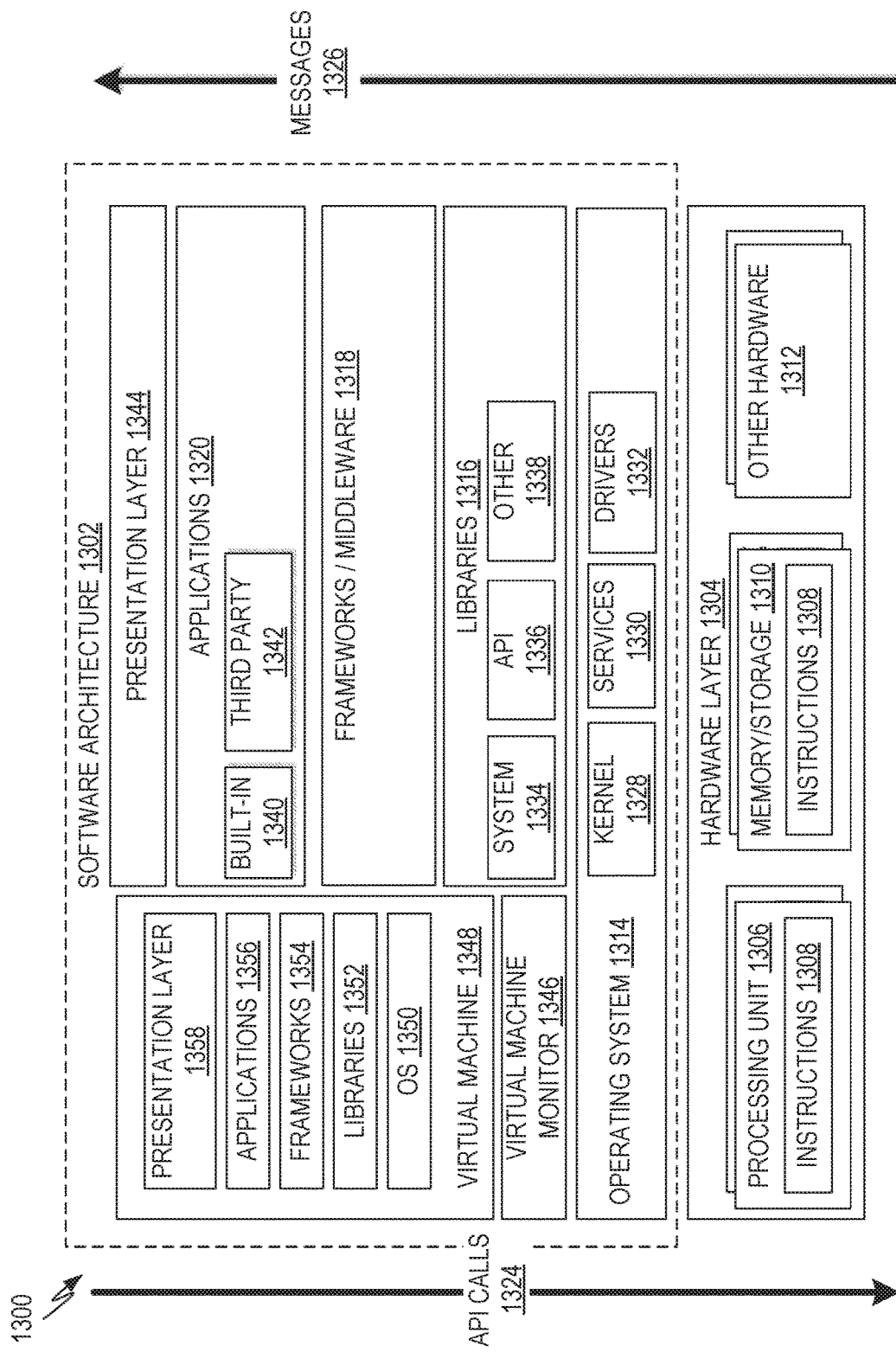
FIG. 13 is a block diagram illustrating a representative software architecture, which may be used in conjunction with various hardware architectures herein described.

FIG. 13 is a block diagram 1300 illustrating a representative software architecture 1302, which may be used in conjunction with various hardware architectures herein described. FIG. 13 is merely a non-limiting example of a software architecture 1302, and it will be appreciated that many other architectures may be implemented to facilitate the functionality described herein. The software architecture 1302 may be executing on hardware such as a machine 1400 of FIG. 14 that includes, among other things, processors 1410, memory/storage 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. The executable instructions 1308 represent the executable instructions of the software architecture 1302, including implementation of the methods, modules, and so forth of FIGS. 1-12. The hardware layer 1304 also includes memory and/or storage modules 1310, which also have the executable instructions 1308. The hardware layer 1304 may also comprise other hardware 1312, which represents any other hardware of the hardware layer 1304, such as the other hardware illustrated as part of the machine 1400.

In the example architecture of FIG. 13, the software architecture 1302 may be conceptualized as a stack of layers where each layer provides particular functions. For example, the software architecture 1302 may include layers such as an operating system 1314, libraries 1316, frameworks/middleware 1318, applications 1320, and a presentation layer 1344. Operationally, the applications 1320 and/or other components within the layers may invoke application programming interface (API) calls 1324 through the software stack and receive a response, returned values, and so forth illustrated as messages 1326 in response to the API calls 1324. The layers illustrated are representative in nature, and not all software architectures have all layers. For example, some mobile or special purpose operating systems may not provide a frameworks/middleware 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1316 may provide a common infrastructure that may be utilized by the applications 1320 and/or other components and/or layers. The libraries 1316 typically provide functions that allows other software modules to perform tasks in an easier fashion than to interface directly with the underlying operating system 1314 functions (e.g., kernel 1328, services 1330, and/or drivers 1332). The libraries 1316 may include system libraries 1334 (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic context on a display), database libraries (e.g., SQLite that may provide various relational database functions), web libraries (e.g., WebKit that may provide web browsing functions), and the like. The libraries 1316 may also include a wide variety of other libraries 1338 to provide many other APIs to the applications 1320 and other software components/modules.

The frameworks/middleware 1318 may provide a higher-level common infrastructure that may be utilized by the applications 1320 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1320 and/or other software components/modules, some of which may be specific to a particular operating system or platform.

The applications 1320 include built-in applications 1340 and/or third-party applications 1342. Examples of representative built-in applications 1340 may include, but are not limited to, a contacts application, a browser application, a book reader application, a location application, a media application, a messaging application, and/or a game application. Third-party applications 1342 may include any of the built-in applications 1340 as well as a broad assortment of other applications. In a specific example, the third-party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1342 may invoke the API calls 1324 provided by the mobile operating system such as the operating system 1314 to facilitate functions described herein.

The applications 1320 may utilize built-in operating system functions (e.g., kernel 1328, services 1330, and/or drivers 1332), libraries (e.g., system libraries 1334, API libraries 1336, and other libraries 1338), and frameworks/middleware 1318 to create user interfaces to interact with users of the system. Alternatively, or additionally, in some systems, interactions with a user may occur through a presentation layer, such as the presentation layer 1344. In these systems, the application/module "logic" can be separated from the aspects of the application/module that interact with a user.

Some software architectures utilize virtual machines. In the example of FIG. 13, this is illustrated by a virtual machine 1348. A virtual machine creates a software environment where applications/modules can execute as if they were executing on a hardware machine (such as the machine 1400 of FIG. 14, for example). The virtual machine 1348 is hosted by a host operating system (operating system 1314 in FIG. 13) and typically, although not always, has a virtual machine monitor 1346, which manages the operation of the virtual machine 1348 as well as the interface with the host operating system (i.e., operating system 1314). A software architecture executes within the virtual machine 1348, such as an operating system 1350, libraries 1352, frameworks/middleware 1354, applications 1356, and/or a presentation layer 1358. These layers of software architecture executing within the virtual machine 1348 can be the same as corresponding layers previously described or may be different.

Example Machine Architecture and Machine-Readable Medium

Figure 14:
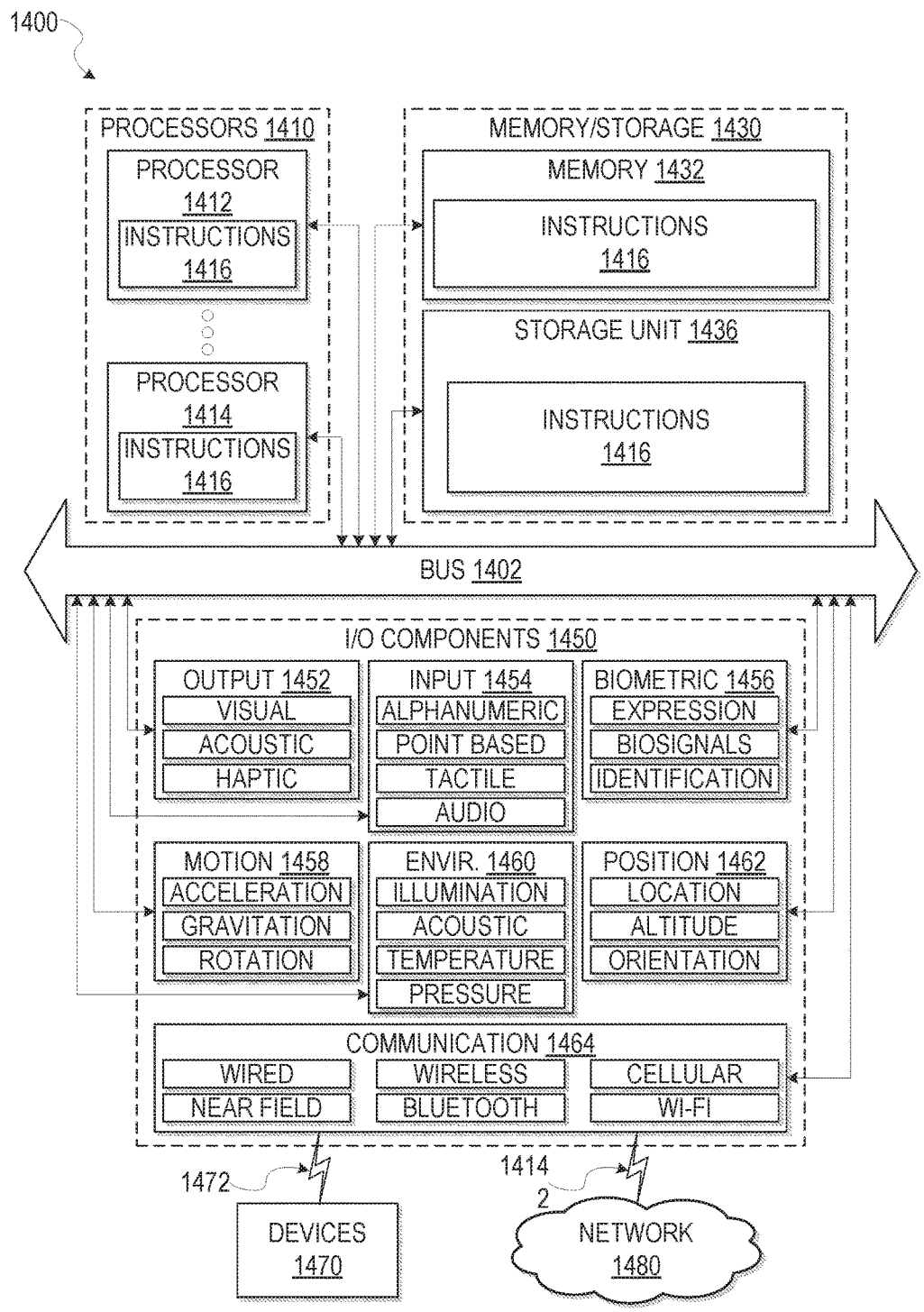
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions 1416 from a machine-readable medium (e.g., a machine-readable storage medium) and perform any one or more of the methodologies discussed herein. Specifically, FIG. 14 shows a diagrammatic representation of the machine 1400 in the example form of a computer system, within which the instructions 1416 (e.g., software, a program, an application, an applet, an app, or other executable code) for causing the machine 1400 to perform any one or more of the methodologies discussed herein may be executed. For example, the instructions 1416 may cause the machine 1400 to execute the flow diagram of FIGS. 2-3. Additionally, or alternatively, the instructions 1416 may implement modules of FIG. 1, and so forth. The instructions 1416 transform the general, non-programmed machine 1400 into a particular machine programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" may also be taken to include a collection of machines 1400 that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 1412 and a processor 1414 that may execute the instructions 1416. The term "processor" is intended to include a multi-core processor 1412, 1414 that may comprise two or more independent processors 1412, 1414 (sometimes referred to as "cores") that may execute the instructions 1416 contemporaneously. Although FIG. 14 shows multiple processors 1410, the machine 1400 may include a single processor 1412, 1414 with a single core, a single processor 1412, 1414 with multiple cores (e.g., a multi-core processor 1412, 1414), multiple processors 1412, 1414 with a single core, multiple processors 1412, 1414 with multiples cores, or any combination thereof.

The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor 1412, 1414's cache memory), or any suitable combination thereof, during execution thereof by the machine 1400. Accordingly, the memory 1432, the storage unit 1436, and the memory of the processors 1410 are examples of machine-readable media.

As used herein, "machine-readable medium" means a device able to store the instructions 1416 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions 1416, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a wide variety of components to receive input, provide output, produce output, transmit information, exchange information, capture measurements, and so on. The specific I/O components 1450 that are included in a particular machine 1400 will depend on the type of machine 1400. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functions merely for simplifying the following discussion, and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472 respectively. For example, the communication components 1464 may include a network interface component or other suitable device to interface with the network 1480. In further examples, the communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a Universal Serial Bus (USB)).

Moreover, the communication components 1464 may detect identifiers or include components operable to detect identifiers. For example, the communication components 1464 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1480 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functions are envisioned and may fall within a scope of various embodiments of the present disclosure. In general, structures and functions presented as separate resources in the example configurations may be implemented as a combined structure or resource. Similarly, structures and functions presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   at least one processor;
   a memory; and
   a middleware management architecture engine stored in the memory and executable by the at least one processor to perform operations comprising:
      performing a first function on a first document received from a first network, causing a change in the status of the first document, the first document being a file stored at the first network;
      logging the change in the status of the first document in a record corresponding to the first document in the memory;
      causing the first document to be sent to a second network via a transmission protocol layer;
      receiving, in a layer other than the transmission protocol layer, from the second network, a notification of a change in status of the first document within the second network, the layer other than the transmission protocol layer being an integration layer having defined therein a plurality of status codes, the notification including one of the status codes;

logging the change to the status of the first document in the second network in the record corresponding to the first document in the memory; and causing the reporting, to the first network, of information corresponding to the change in the status of the first document in the middleware management architecture and the change in the status of the first document in the second network.

2. The system of claim 1, further comprising:

an integration layer configured to perform operations comprising:

receiving a first communication comprising the first document from the first network;

transforming the first communication into a format compatible with the engine;

sending the first communication to the middleware management architecture engine;

transforming a second communication comprising the first document into a format compatible with the second network;

sending the second communication to the second network via a transmission protocol layer;

receiving, in a layer other than the transmission protocol layer, from the second network, in a third communication, a notification of a change in status of the first document within the second network;

transforming the third communication into a format compatible with the middleware management architecture engine: and sending the third communication to the middleware management architecture engine.

3. The system of claim 2, wherein the integration layer and the middleware management architecture engine are contained within a middleware management architecture.

4. The system of claim 1, further comprising an integration server to perform operations comprising:

receiving a first communication comprising first document from the first network;

transforming the first communication into a format compatible with the middleware management architecture engine;

sending the first communication to the middleware management architecture engine;

transforming a second communication comprising the first document into a format compatible with the second network;

sending the second communication to the second network via a transmission protocol layer;

receiving, in a layer other than the transmission protocol layer, from the second network, in a third communication, a notification of a change in status of the first document within the second network;

transforming the third communication into a format compatible with the middleware management architecture engine; and sending the third communication to the middleware management architecture engine.

5. The system of claim 1, further comprising a buffer containing a queue, and the first document is sent to the first network by placing the first document in the queue and sending a plurality of document in the queue in a batch mode when the queue becomes full.

6. A method of tracking status of a computerized document through multiple computer networks, the method comprising:

receiving, at a middleware management architecture, a first document from a first network, the first document being a file stored at the first network;

performing, at the middleware management architecture, a first function on the first document, causing a change in the status of the first document;

logging the change in the status of the first document in a record corresponding to the first document in a memory;

sending the first document to a second network via a transmission protocol layer;

receiving, in a layer other than the transmission protocol layer, from the second network, a notification of a change in status of the first document within the second network, the layer other than the transmission protocol layer being an integration layer having defined therein a plurality of status codes, the notification including one of the status codes;

logging the change to the status of the first document in the second network in the record corresponding to the first document in the memory; and reporting, to the first network, information corresponding to the change in the status of the first document in the middleware management architecture and the change in the status of the first document in the second network.

7. The method of claim 6, further comprising:

sending the first document to a third network via a transmission protocol layer;

receiving, in the layer other than the transmission protocol layer, from the second network, a notification of a change in status of the first document within the second network; and logging the change to the status of the first document in the third network in the record corresponding to the first document in the memory.

8. The method of claim 6, wherein the sending of the first document include placing the first document in a queue within a buffer and sending a plurality of document in the queue in a batch mode when the queue becomes full.

9. The method of claim 8, wherein a size of the buffer is larger than a size of the queue.

10. The method of claim 9, further comprising:

examining status updates for the first document to determine whether the first document was successfully sent to the first network; and in response to a determination that the first document was not successfully sent to the first network, placing the first document back in the queue.

11. The method of claim 10, wherein both the queue and buffer sizes are dynamically determined based on network bandwidth.

12. The method of claim 10, both the queue and buffer sizes are dynamically determined based on processing load.

13. The method of claim 12, wherein both the queue and buffer sizes are also dynamically determined based on network bandwidth.

14. A non-transitory machine-readable storage medium comprising instructions, which when implemented by one or more machines, cause the one or more machines to perform operations comprising:

receiving, at a middleware management architecture, a first document from a first network, the first document being a file stored at the first network;

performing, at the middleware management architecture, a first function on the first document, causing a change in the status of the first document;

logging the change in the status of the first document in a record corresponding to the first document in a memory;

sending the first document to a second network via a transmission protocol layer;

receiving, in a layer other than the transmission protocol layer, from the second network, a notification of a change in status of the first document within the second network, the layer other than the transmission protocol layer being an integration layer having defined therein a plurality of status codes, the notification including one of the status codes;

logging the change to the status of the first document in the second network in the record corresponding to the first document in the memory; and reporting, to the first network, information corresponding to the change in the status of the first document in the middleware management architecture and the change in the status of the first document in the second network.

15. The non-transitory machine-readable storage medium of claim 14, further comprising:

sending the first document to a third network via a transmission protocol layer;

receiving, in the layer other than the transmission protocol layer, from the second network, a notification of a change in status of the first document within the second network; and logging the change to the status of the first document in the third network in the record corresponding to the first document in the memory.

16. The non-transitory machine-readable storage medium of claim 14, wherein the sending of the first document include placing the first document in a queue within a buffer and sending a plurality of document in the queue in a batch mode when the queue becomes full.

17. The non-transitory machine-readable storage medium of claim 16, wherein a size of the buffer is larger than a size of the queue.

18. The non-transitory machine-readable storage medium of claim 17, further comprising:

examining status updates for the first document to determine whether the first documentwas successfully sent to the first network; and in response to a determination that the first document was not successfully sent to the first network, placing the first document back in the queue.

19. The non-transitory machine-readable storage medium of claim 18, wherein both the queue and buffer sizes are dynamically determined based on processing load.

20. The non-transitory machine-readable storage medium of claim 19, wherein both the queue and buffer sizes are also dynamically determined based on network bandwidth.

* * * * *

UNITED STATES PATENT AND TRADEMARK OFFICE
CERTIFICATE OF CORRECTION

PATENT NO. : 11,057,288 B2  
APPLICATION NO. : 15/373993  
DATED : July 6, 2021  
INVENTOR(S) : Ubillus et al.

Page 1 of 1

It is certified that error appears in the above-identified patent and that said Letters Patent is hereby corrected as shown below:

On the Title Page

Item (72), in "Inventors", in Column 1, Line 3, delete "Arun" and insert --Arunkumar-- therefor In the Claims In Column 27, Line 39, in Claim 4, after "comprising", insert --the--

In Column 28, Line 53, in Claim 12, after "claim 10,", insert --wherein--

In Column 30, Line 16, in Claim 18, delete "documentwas" and insert --document was-- therefor Signed and Sealed this  
Eighteenth Day of January, 2022

Drew Hirshfeld  
*Performing the Functions and Duties of the*  
*Under Secretary of Commerce for Intellectual Property and*  
*Director of the United States Patent and Trademark Office*